United States Patent
Kuo et al.

(10) Patent No.: US 8,958,025 B2
(45) Date of Patent: Feb. 17, 2015

(54) DISPLAY BACK FRAME AND LIQUID CRYSTAL DISPLAY DEVICE

(75) Inventors: Yi-cheng Kuo, Shenzhen (CN);
Yu-chun Hsiao, Shenzhen (CN);
Chengwen Que, Shenzhen (CN);
Pangling Zhang, Shenzhen (CN);
Dehua Li, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 348 days.

(21) Appl. No.: 13/581,305

(22) PCT Filed: Aug. 3, 2012

(86) PCT No.: PCT/CN2012/079616
§ 371 (c)(1),
(2), (4) Date: Aug. 25, 2012

(87) PCT Pub. No.: WO2014/015533
PCT Pub. Date: Jan. 30, 2014

(65) Prior Publication Data
US 2014/0022485 A1    Jan. 23, 2014

(30) Foreign Application Priority Data
Jul. 23, 2012  (CN) .......................... 2012 1 0255941

(51) Int. Cl.
*G02F 1/1333*  (2006.01)

(52) U.S. Cl.
USPC ............................................. 349/58

(58) Field of Classification Search
USPC ............................................. 349/58
See application file for complete search history.

(56) References Cited

U.S. PATENT DOCUMENTS

| | | | |
|---|---|---|---|
| 7,414,594 B2 * | 8/2008 | Kim et al. ................. 345/1.3 |
| 7,777,827 B2 * | 8/2010 | Park ............................ 349/58 |
| 2010/0177020 A1 * | 7/2010 | Bemelmans et al. ......... 345/55 |
| 2010/0328556 A1 * | 12/2010 | Yamamoto .................. 348/790 |
| 2012/0205508 A1 * | 8/2012 | Cusson et al. ........... 248/231.81 |
| 2013/0069878 A1 * | 3/2013 | Li ............................... 345/168 |
| 2014/0022485 A1 * | 1/2014 | Kuo et al. ..................... 349/58 |
| 2014/0028946 A1 * | 1/2014 | Kuo et al. ..................... 349/58 |
| 2014/0036196 A1 * | 2/2014 | Hsiao et al. ................... 349/58 |
| 2014/0043557 A1 * | 2/2014 | Kuo et al. ..................... 349/58 |
| 2014/0043792 A1 * | 2/2014 | Kuo et al. ................... 362/97.1 |

\* cited by examiner

*Primary Examiner* — Timothy L Rude
(74) *Attorney, Agent, or Firm* — Andrew C. Cheng

(57) ABSTRACT

The present invention provides a display back frame and liquid crystal display device. Display back frame includes a plurality of splicing elements spliced together, with at least a part of splicing elements connected through rotation mechanism. Splicing element includes main part and stop wall. The stop wall includes bottom part, side wall and top part. Bottom part and outer edge of the main part is connected levelly. Top part is disposed in parallel with the bottom part with a spacing gap. Side wall is disposed between top part and bottom part. Surface of the main part facing the top part has a first bump. As such, through the above disposition, the present invention can reduce required space during storage and transport to improve transport and storage efficiency, and save the use of mold frame to simplify assembly and improve assembly efficiency to reduce cost.

20 Claims, 8 Drawing Sheets

DISPLAY BACK FRAME AND LIQUID CRYSTAL DISPLAY DEVICE

BACKGROUND OF THE INVENTION

1. Field of the Invention

The present invention relates to the field of displaying techniques, and in particular to a display back frame and liquid crystal display device.

2. The Related Arts

The known liquid crystal display device usually comprises mold frame, back frame, liquid crystal panel, optical film and light-guiding plate (LGP).

Among the components, the mold frame and back frame of the liquid crystal display panel are mainly for fixing optical components, such as, light source, light-guiding plate and optical film and for carrying liquid crystal panel.

However, the known back frame of liquid crystal display device is usually made of a monolithic structure, manufactured by metal stamping or plastic inject molding techniques so that the back frame is usually heavier in weight. In addition, a large-sized back frame usually requires larger stamping equipments and larger molds with complex structure, thus, a higher cost. Furthermore, the monolithically structured back frame requires more storage and transport cost and results in less efficiency in storage in transport.

Even further, when fixing optical components, such as, light source, light-guiding plate and optical film and for carrying liquid crystal panel, the back frame must be used with mold frame so that the liquid crystal display device has a higher cost as well as more assembly time leading to reduced efficiency.

SUMMARY OF THE INVENTION

The technical issue to be addressed by the present invention is to provide a display back frame and liquid crystal display device, which reduce required space during storage and transport to improve transport and storage efficiency to as well as save the use of mold frame to reduce cost.

The present invention provides a display back frame, which comprises: a plurality of splicing elements spliced together, at least a part of splicing elements being connected through rotation mechanism so that the display back frame able to switch between a normal usage state and a folded state, the display back frame in the folded state being smaller in size than in the normal usage state, wherein the splicing element comprising main part and stop wall, the stop wall comprising bottom part, side wall and top part, the bottom part and outer edge of the main part being connected levelly, the top part disposed in parallel with the bottom part with a spacing gap, the side wall being disposed between the top part and the bottom part, surface of the main part facing the top part being disposed with a first bump and a second bump, wherein height of the first bump being higher than height of the second bump.

According to a preferred embodiment of the present invention, in the normal usage state, the plurality of splicing elements comprise: a first support frame and a second support frame disposed in parallel; a third support frame and a fourth support frame disposed in parallel; the third support frame connected perpendicularly respectively to one end of each of the first support frame and the second support frame; and the fourth support frame connected perpendicularly respectively to the other end of each of the first support frame and the second support frame.

The present invention provides a display back frame, which comprises: a plurality of splicing elements spliced together, at least a part of splicing elements being connected through rotation mechanism so that the display back frame able to switch between a normal usage state and a folded state, the display back frame in the folded state being smaller in size than in the normal usage state, wherein the splicing element comprising main part and stop wall, the stop wall comprising bottom part, side wall and top part, the bottom part and outer edge of the main part being connected levelly, the top part disposed in parallel with the bottom part with a spacing gap, the side wall being disposed between the top part and the bottom part, surface of the main part facing the top part being disposed with a first bump.

According to a preferred embodiment of the present invention, the surface of the main part facing the top part is also disposed with a second bump, wherein height of the first bump is higher than height of the second bump.

According to a preferred embodiment of the present invention, in the normal usage state, the plurality of splicing elements comprise: a first support frame and a second support frame disposed in parallel; a third support frame and a fourth support frame disposed in parallel; the third support frame connected perpendicularly respectively to one end of each of the first support frame and the second support frame; and the fourth support frame connected perpendicularly respectively to the other end of each of the first support frame and the second support frame; a plurality of auxiliary support frames are disposed between the first support frame and the second support frame, with both ends of each of the auxiliary support frames connected respectively to the first support frame and the second support frame.

According to a preferred embodiment of the present invention, the first support frame comprises a first main part and a first extension part extending from one end of the first main part; the second support frame comprises a second main part and a second extension part extending from one end of the second main part; the first extension part and one end of the third support frame, the other end of the third support frame and one end of the second main part away from the second extension part, the second extension part and one end of the fourth support frame, the other end of the fourth support frame and one end of the first main part away from the first extension part are all connected respectively through the rotation mechanism.

According to a preferred embodiment of the present invention, in the folded state, the first main part is connected levelly to the fourth support frame and is located between the first extension part and the second extension part; the second main part is connected levelly to the third support frame and is located between the first extension part and the second extension part; wherein the total length of first main part levelly connected to the fourth support frame is equal to the total length of second main part levelly connected to the third support frame.

The present invention provides a liquid crystal display device, which comprises: a display back frame, formed by splicing a plurality of splicing elements together, at least a part of splicing elements being connected through rotation mechanism so that the display back frame able to switch between a normal usage state and a folded state, the display back frame in the folded state being smaller in size than in the normal usage state, wherein the splicing element comprising main part and stop wall, the stop wall comprising bottom part, side wall and top part, the bottom part and outer edge of the main part being connected levelly, the top part disposed in parallel with the bottom part with a spacing gap, the side wall being disposed between the top part and the bottom part, surface of the main part facing the top part being disposed with a first bump; light-guiding plate, disposed inside the display back frame, comprising a light entering surface and a light exiting surface; optical film; disposed on the light-guiding plate; light source, disposed on side wall of the display back frame facing the light entering surface of light-guiding plate; liquid crystal panel, disposed on the top part of the back frame of liquid crystal display device; and front frame, assembled with the display back frame, for sandwiching liquid crystal panel firmly between the front frame and the display back frame.

The efficacy of the present invention is that to be distinguished from the state of the art. The display back frame of the present invention can switch between a normal usage state and a folded state with the display back frame in the folded state being smaller in size than in the normal usage state, as well as uses stop wall and first bump to fix and support light-guiding plate, optical film and liquid crystal panel. As such, through the above disposition, the present invention can reduce required space during storage and transport to improve transport and storage efficiency, as well as save the use of mold frame to simplify assembly and improve assembly efficiency to reduce cost.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
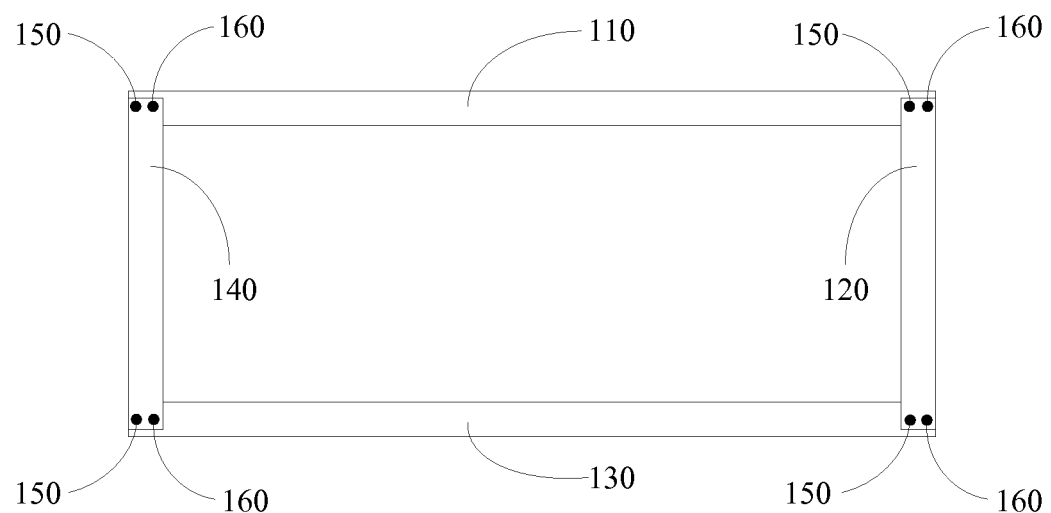
FIG. 1 is a top view showing the structure of the first embodiment of the display back frame in normal usage state according to the present invention.
Figure 2:
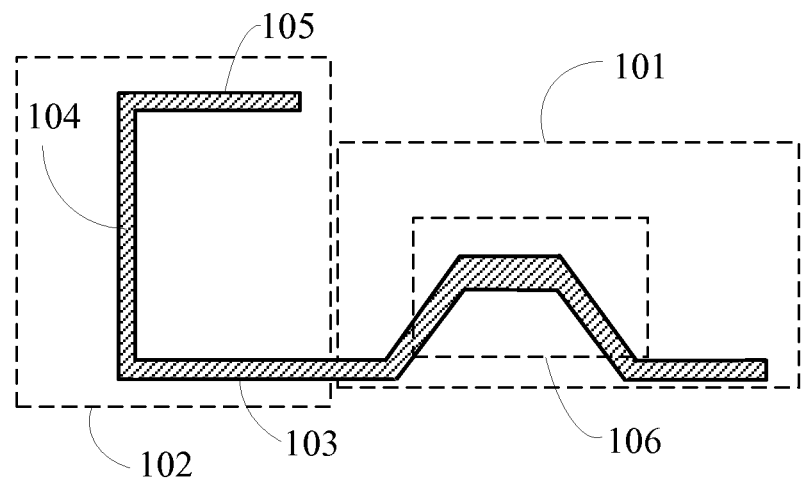
FIG. 2 is a schematic view showing the structure of the main splicing element according to the present invention.
Figure 3:
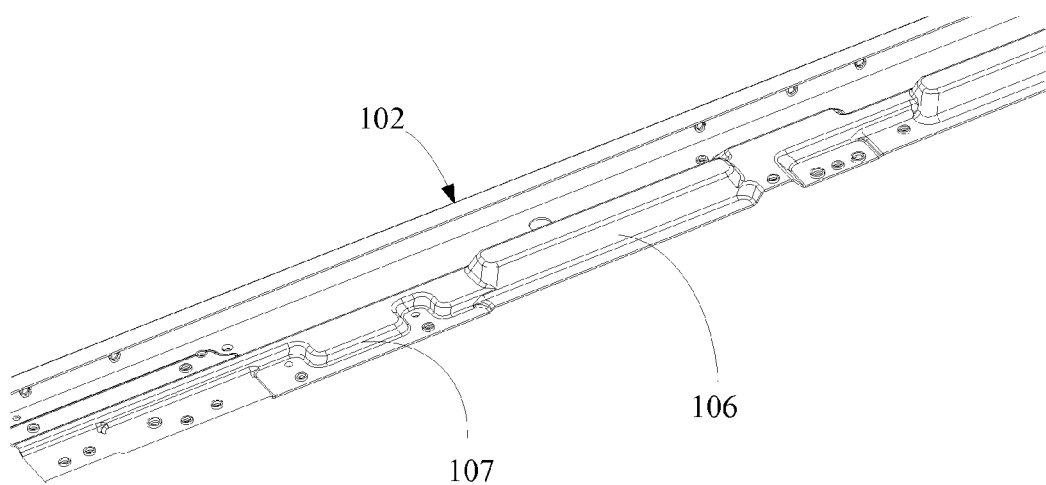
FIG. 3 is a schematic view showing the three-dimensional structure of the main splicing element of FIG. 2.

Referring to FIGS. 1-3, FIG. 1 is a top view showing the structure of the first embodiment of the display back frame in normal usage state according to the present invention; FIG. 2 is a schematic view showing the structure of the main splicing element according to the present invention; and FIG. 3 is a schematic view showing the three-dimensional structure of the main splicing element of FIG. 2. As shown in FIG. 1, a display back frame comprises first main splicing elements 110, 130, second main splicing elements 120, 140, a plurality of rotation mechanisms 150 and a plurality of position-stopping mechanisms 160.

In the instant embodiment, each of first main splicing elements 110, 130 and second main splicing elements 120, 140 comprises main part and stop wall, with specific structure shown in FIG. 2. As shown in FIG. 2, a main splicing element comprises a main part 101 and a stop wall 102, wherein stop wall comprises a bottom part 103, a side wall 104 and a top part 105. Bottom part 103 and outer edge of main part 101 are connected levelly. Top part 103 is disposed in parallel with bottom part 103 with a spacing gap. Side wall 104 is disposed between top part 103 and bottom part 105. Therefore, bottom part 103, side wall 104 and bottom part 105 form a U-shaped structure, with opening of U-shape facing main part 101.

Refer to FIGS. 2 and 3. In the instant embodiment, a surface of main part 101 facing top part 105 of stop wall 102 is disposed with a first bump 106 (as shown in FIG. 2 and FIG. 3). Preferably, first bump 106 is disposed at both end of main part 101 for supporting four corners of light-guiding plate and optical film when assembling the light-guiding plate and optical film. The surface of main part 101 facing top part 105 of stop wall 102 is further disposed with a second bump 107 (as shown in FIG. 3), wherein second bump 107 is connected to first bump 106, and height of the first bump 106 is higher than height of the second bump 107.

Refer to FIG. 1 again. First main splicing elements 110, 130 and second main splicing elements 120, 140 having main parts and stop walls are spliced to form an outer frame of the back plate. The outer frame of the display back frame in a normal usage state is a rectangular structure. Specifically, first main splicing elements 110, 130 are disposed in parallel, and second main splicing elements 120, 140 are disposed in parallel. Two ends of first main splicing elements 110, 130 are connected to one end of second main splicing elements 120, 140 through rotation mechanism 150 so that adjacent first main splicing elements 110, 130 and second main splicing elements 120, 140 can rotate with rotation mechanism 150 as axis so that the display back frame can switch between the normal usage state and the folded state.

At the junction points between first main splicing elements 110, 130 and second main splicing elements 120, 140 are disposed with position-stopping mechanisms 160 so as to fasten first main splicing elements 110, 130 and second main splicing elements 120, 140 in the normal usage state. In the instant embodiment, position-stopping mechanisms 160 are disposed at the junction points between first main splicing elements 110, 130 and second main splicing elements 120, 140 to provide better fastening to first main splicing elements 110, 130 and second main splicing elements 120, 140. In other embodiments, to save cost or reduce complexity, position-stopping mechanisms 160 can also be disposed at one or more locations for fastening element. In the instant embodiment, rotation mechanism 150 and position-stopping mechanism 160 can be screw, rivet, bolt or any other equivalent fastening element.

Figure 4:
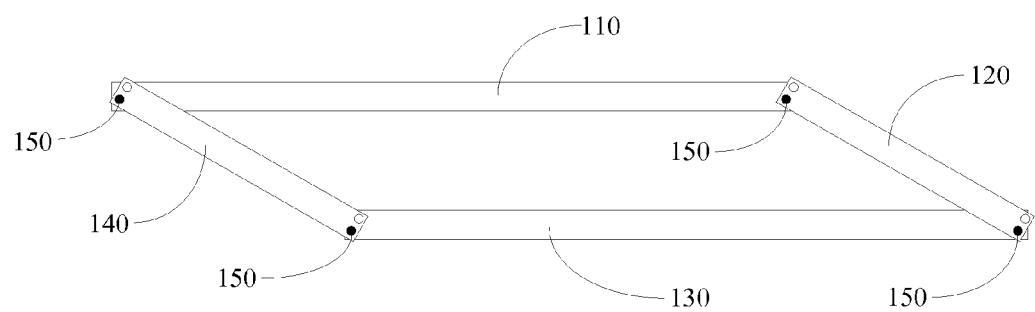
FIG. 4 is a top view showing the structure of the first embodiment of the display back frame in folded state according to the present invention.

Referring to FIG. 4, FIG. 4 is a top view showing the structure of the first embodiment of the display back frame in folded state according to the present invention. Compared to FIG. 1, when switching from normal usage state to folded state, position-stopping mechanisms 160 of the display back frame are removed so that first main splicing elements 110, 130 and second main splicing elements 120, 140 can rotate around rotation mechanism 150, respectively. As such, the outer frame of the display back frame changes from a rectangle to a parallelogram, so that the display back frame in folded state occupies a smaller space than in normal usage state.

Figure 5:
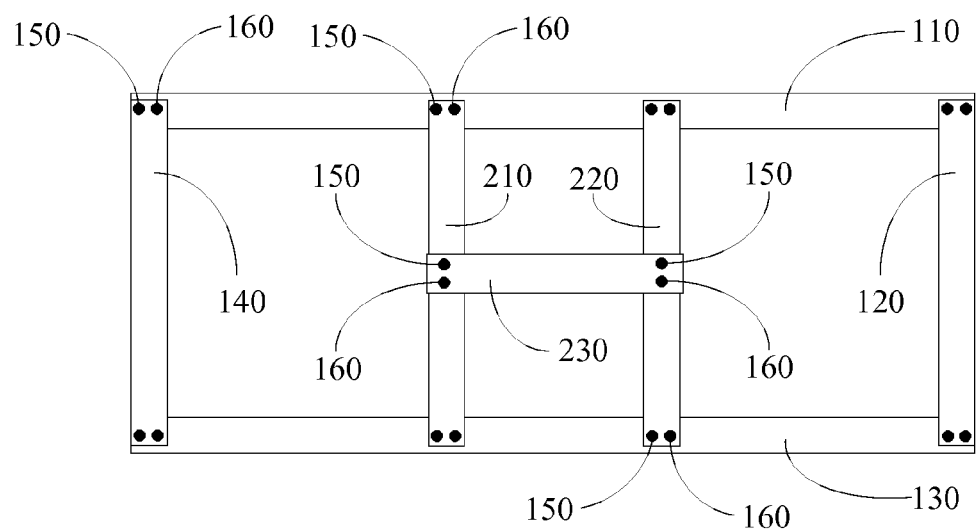
FIG. 5 is a top view showing the structure of the second embodiment of the display back frame in normal usage state according to the present invention.
Figure 6:
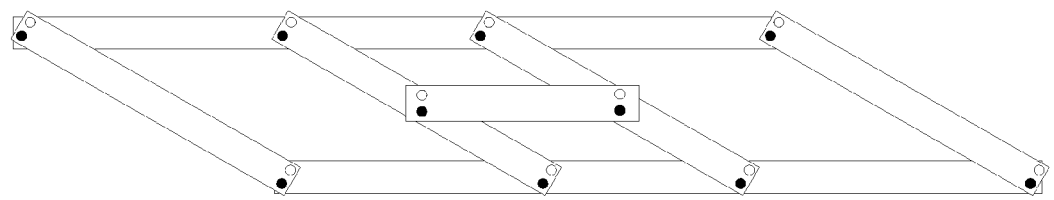
FIG. 6 is a top view showing the structure of the second embodiment of the display back frame in folded state according to the present invention.

Referring to FIG. 5 and FIG. 6, FIG. 5 is a top view showing the structure of the second embodiment of the display back frame in normal usage state according to the present invention; and FIG. 6 is a top view showing the structure of the second embodiment of the display back frame in folded state according to the present invention. Compared to the first embodiment, first main splicing elements 110, 130 are disposed in parallel, and second main splicing elements 120, 140 are disposed in parallel in this embodiment, too. The difference between this embodiment and the first embodiment is that the display back frame further comprises first auxiliary splicing elements 210, 220 and second auxiliary splicing element 230, wherein first auxiliary splicing elements 210, 220 are in parallel with second main splicing elements 120, 140, and second auxiliary splicing element 230 is in parallel with first main splicing elements 110, 130.

In the instant embodiment, two ends of first auxiliary splicing elements 210, 220 are respectively connected to two first main splicing elements 110, 130 through rotation mechanism 150; two ends of second auxiliary splicing element 230 are respectively connected to two first auxiliary splicing elements 210, 220 through rotation mechanism 150. Similarly, position-stopping mechanisms 160 are disposed at the junction points between first auxiliary splicing elements 210, 220 and first main splicing elements 110, 130, and between auxiliary splicing element 230 and two first auxiliary splicing elements 210, 220 to provide better fastening to the display back frame. Other embodiments may comprise one or more first auxiliary splicing elements, or more second auxiliary elements, and the numbers of position-stopping mechanisms 160 can be less.

Because first auxiliary splicing elements 210, 220 and second auxiliary splicing elements 230 are disposed within the outer frame formed by first main splicing elements 110, 130 and second main splicing elements 120, 140, and are in parallel with first main splicing elements 110, 130 or second main splicing elements 120, 140, therefore, the display back frame in this embodiment can also switch between the normal usage state of FIG. 5 and the folded state of FIG. 6, and the display back frame in folded state occupies a smaller space than in normal usage state.

Figure 7:
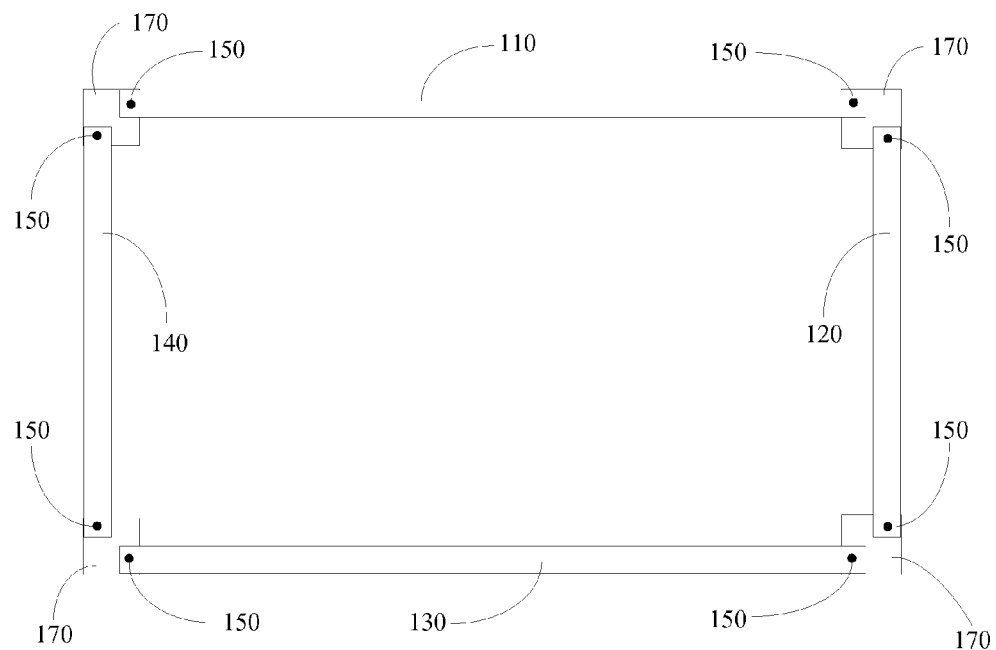
FIG. 7 is a top view showing the structure of the third embodiment of the display back frame in normal usage state according to the present invention.
Figure 8:
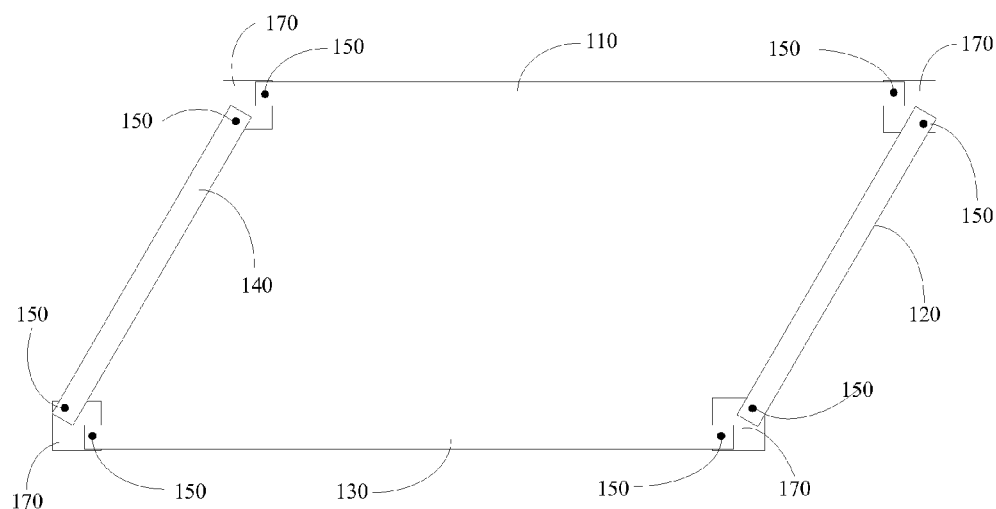
FIG. 8 is a top view showing the structure of the third embodiment of the display back frame in folded state according to the present invention.

Referring to FIG. 7 and FIG. 8, FIG. 7 is a top view showing the structure of the third embodiment of the display back frame in normal usage state according to the present invention; and FIG. 8 is a top view showing the structure of the third embodiment of the display back frame in folded state according to the present invention. Compared to the first embodiment, first main splicing elements 110, 130 are disposed in parallel, and second main splicing elements 120, 140 are disposed in parallel in this embodiment, too. The difference between this embodiment and the first embodiment is that the display back frame further comprises four auxiliary mechanisms 170. Two ends of first main splicing elements 110, 130 and two ends of second main splicing elements 120, 140 are connected to respective rotation mechanism 150 through corresponding auxiliary mechanism 170. As such, the display back frame in this embodiment can also switch between the normal usage state of FIG. 7 and the folded state of FIG. 8, and the display back frame in folded state occupies a smaller space than in normal usage state.

Figure 9:
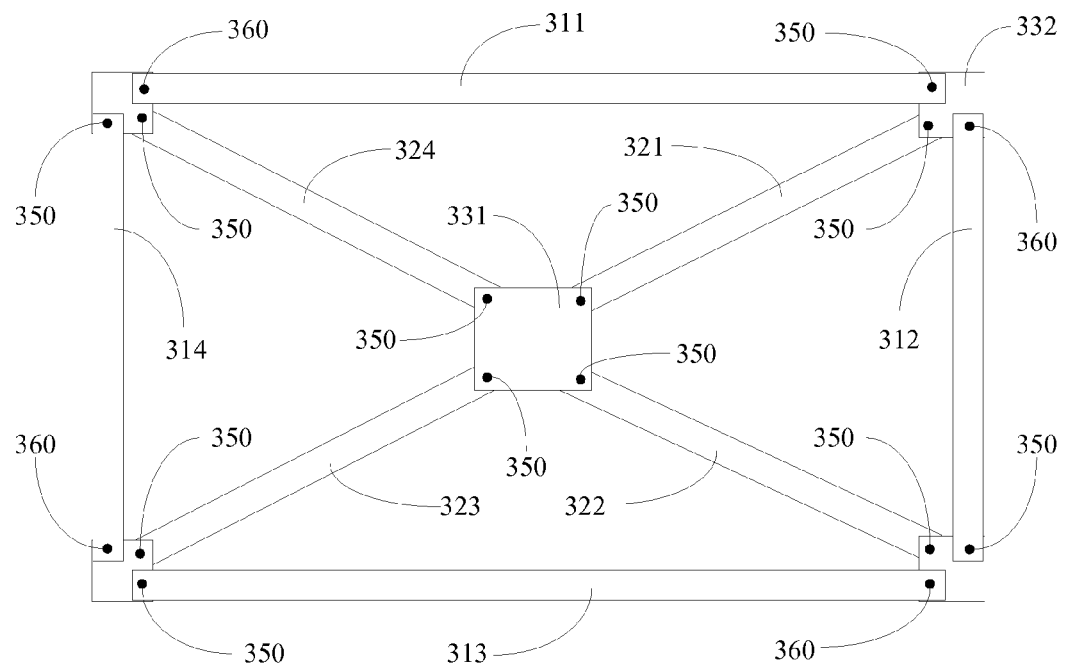
FIG. 9 is a top view showing the structure of the fourth embodiment of the display back frame in normal usage state according to the present invention.

Referring to FIG. 9, FIG. 9 is a top view showing the structure of the fourth embodiment of the display back frame in normal usage state according to the present invention. In the instant embodiment, the display back frame comprises two first main splicing elements 311, 313, two second main splicing elements 312, 314, four auxiliary splicing elements 321, 322, 323, 324, a first auxiliary mechanism 331, four second auxiliary mechanisms 332, a plurality of rotation mechanisms 350 and a plurality of position-stopping mechanisms 360.

In normal usage state, first main splicing elements 311, 313 are disposed in parallel in normal usage state, and second main splicing elements 312, 314 are disposed in parallel to form outer frame of the display back frame. In the instant embodiment, one end of each of first main splicing elements 311, 313 and second main splicing elements 312, 314 is connected to corresponding second auxiliary mechanism 332 through rotation mechanism 350 respectively, and the other end is connected to corresponding second auxiliary mechanism 332 through stop mechanism 360. Auxiliary splicing elements 321, 322, 323, 324 are disposed in a cross manner, with one end connected to corresponding second auxiliary mechanism 332 through rotation mechanism 350 and the other end connected to first auxiliary mechanism 331 through rotation mechanism 350.

Figure 10:
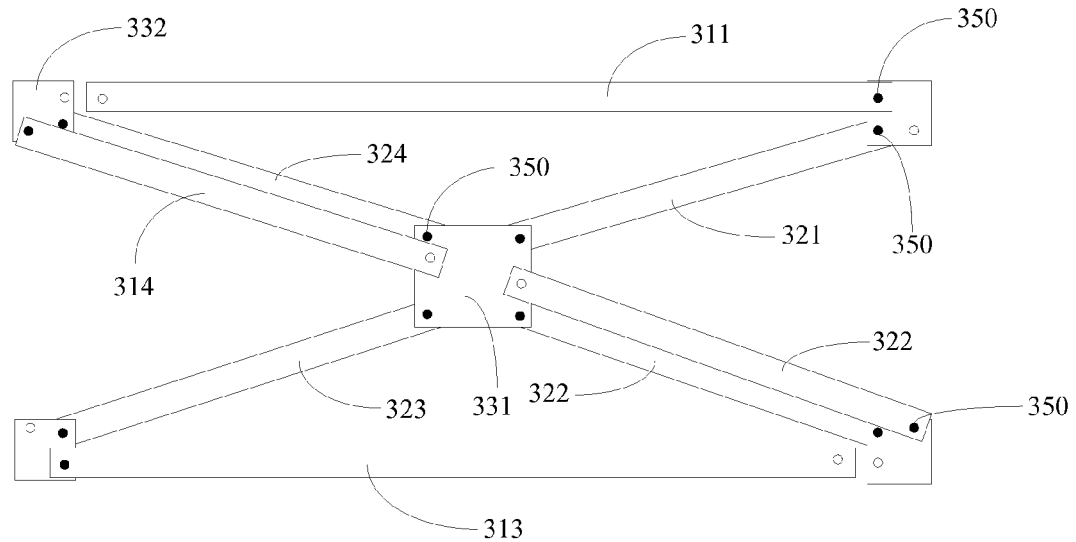
FIG. 10 is a top view showing the structure of the fourth embodiment of the display back frame in folded state according to the present invention.

Referring to FIG. 10, FIG. 10 is a top view showing the structure of the fourth embodiment of the display back frame in folded state according to the present invention. When switching from normal usage state to folded state, stop mechanisms 360 of the display back frame are removed so that each auxiliary splicing element 321, 322, 323, 324 can rotate around first auxiliary mechanism 331 to reduce width of the back plate to save space. In the mean time, first main splicing elements 311, 313 and second main splicing elements 312, 314 use rotation mechanism 350 as axis to make fastened end of stop mechanism 360 rotate towards first auxiliary mechanism 331. As different from the first to the third embodiments of the present invention, the present embodiment uses first auxiliary mechanism 331 as a center to rotate auxiliary splicing elements 321, 322, 323, 324 to realize the switching between the normal usage state shown in FIG. 9 and the folded state shown in FIG. 10 so that the back plate in folded state occupies a smaller space than in normal usage state.

In other embodiments, the third embodiment can be simplified, for example, by cancelling second auxiliary mechanism 332. One end of first main splicing elements 311, 313 and one end of second main splicing elements 312, 314 are connected respectively to one end of corresponding auxiliary splicing elements 321, 322, 323, 324 through rotation mechanism 350. Alternatively, auxiliary splicing elements 321, 323 are replaced by an auxiliary splicing element, auxiliary splicing elements 322, 324 are replaced by another auxiliary splicing element and rotation mechanism 350 is placed between the two for connection.

Figure 11:
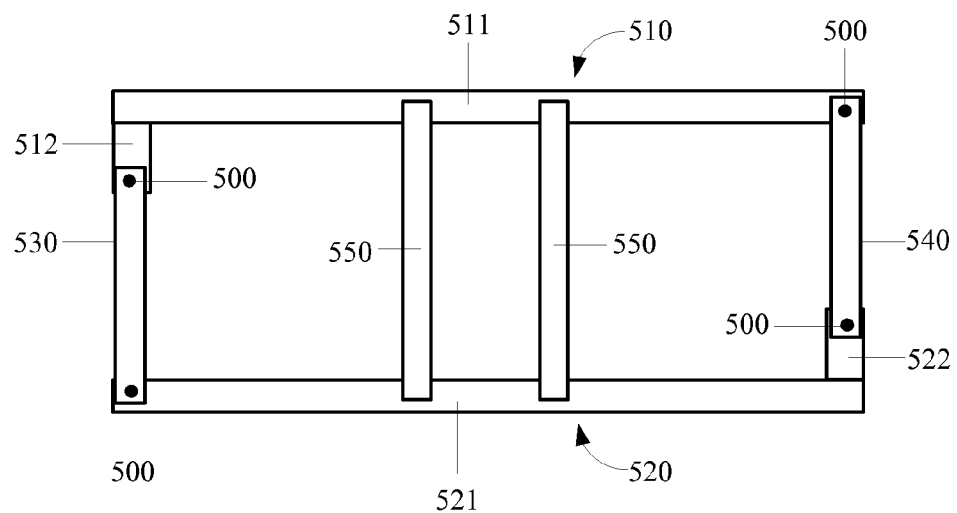
FIG. 11 is a top view showing the structure of the fifth embodiment of the display back frame in normal usage state according to the present invention.

Referring to FIG. 11, FIG. 11 is a top view showing the structure of the fifth embodiment of the display back frame in normal usage state according to the present invention. In the instant embodiment, the display back frame comprises first support frame 510, second support frame 520, third support frame 530, aluminum extrusion 540 and auxiliary support frame 550.

In normal usage state, first support frame 510 and second support frame 520 are disposed in parallel, and third support frame 530 and fourth support frame 540 are disposed in parallel. First support frame 510, second support frame 520, third support frame 530 and fourth support frame 540 are spliced to form the rectangular outer frame of the display back frame. Auxiliary support frame 550 is disposed between first support frame 510 and second support frame 520, with two ends connected respectively to first support frame 510 and second support frame 520. Auxiliary support frame 550 is in parallel with third support frame 530 and fourth support frame 540. The number of auxiliary support frames 550 can be single or plural.

Figure 12:
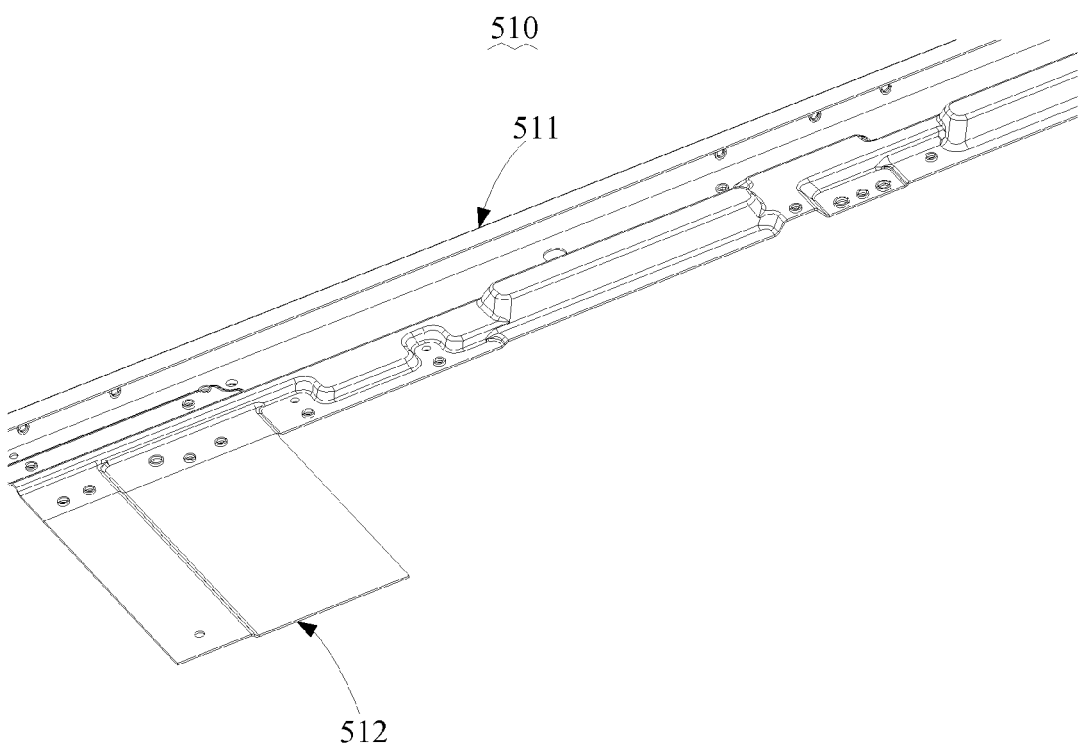
FIG. 12 is a schematic view showing the three-dimensional structure of first support frame of the display back frame of FIG. 11.

Also referring to FIG. 12, FIG. 12 is a schematic view showing the three-dimensional structure of first support frame 510. In this embodiment, first support frame 510 comprises a first main part 511 and a first extension part 512, extending perpendicularly from one end of first main part 511; wherein first main part 511 has the same structure as the main splicing element of FIG. 3. Thus, the description is omitted here.

In the instant embodiment, second support frame 520 has the same structure as first support frame 510, that is, second support frame 520 comprises a second main part 521 and a second extension part 522, extending perpendicularly from one end of second main part 521.

Refer to FIG. 11 again. First extension part 512 and one end of third support frame 530, the other end of third support frame 530 and one end of second main part 521 away from second extension part 522, second extension part 522 and one end of fourth support frame 540, the other end of fourth support frame 540 and one end of first main part 511 away from first extension part 512 are all connected respectively through a rotation mechanism 500.

Figure 13:
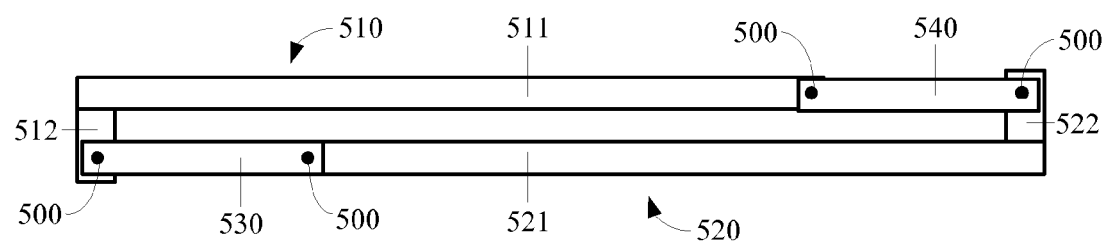
FIG. 13 is a top view showing the structure of the fifth embodiment of the display back frame in folded state according to the present invention.

In comparison with FIG. 11, FIG. 13 is a top view showing the structure of the fifth embodiment of the back plate in folded state according to the present invention. When switching from normal usage state to folded state, auxiliary support frame 550 of the display back frame is removed so that first support frame 510 and second support frame 520, and third support frame 530 and fourth support frame 540 can rotate around rotation mechanism 500 respectively. As such, the outer frame of the display back frame changes from a rectangle to a parallelogram. When the display back frame is in the folded state, first main part 511 is connected levelly to fourth support frame 540 and is located between first extension part 512 and second extension part 522. Similarly, second main part 521 is connected levelly to third support frame 530 and is located between first extension part 512 and second extension part 522. In addition, the total length of first main part 511 levelly connected to fourth support frame 540 is equal to the total length of second main part 521 levelly connected to third support frame 530.

As such, the display back frame of the instant embodiment can also switch between the normal usage state shown in FIG. 11 and the folded state shown in FIG. 13, and the back plate in folded state occupies a smaller space than in normal usage state.

In other embodiments, those having ordinary skills in the art may easily vary the structures and elements of these drawings without paying any creative effort as long as some of the splicing elements are able to rotate through rotation mechanism so that the back plate can switch between a normal usage state and a folded state to achieve the object of the present invention, and not limited to embodiments shown in FIGS. 1-13.

Figure 14:
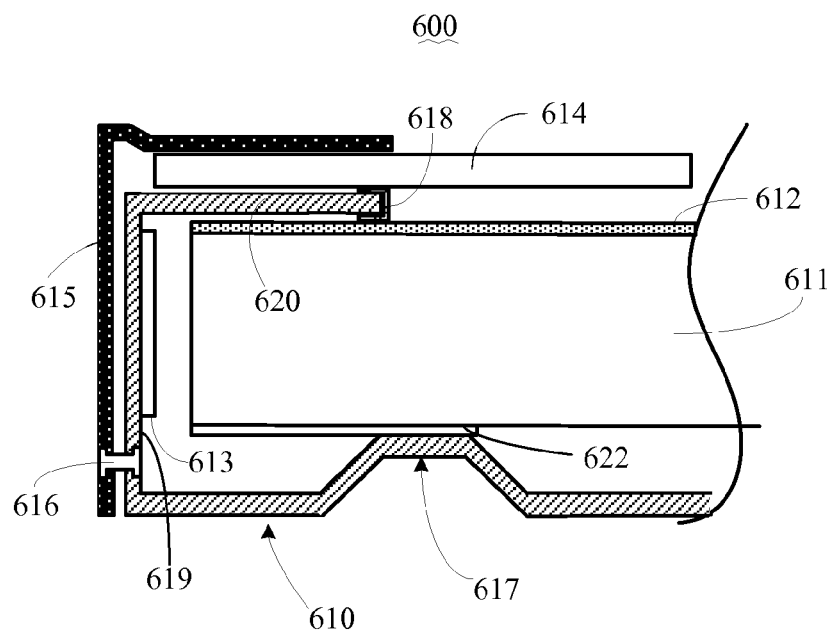
FIG. 14 is a schematic view showing the structure of a liquid crystal display device according to the present invention.

Referring to FIG. 14, FIG. 14 is a schematic view showing the structure of a liquid crystal display device according to the present invention. As shown in FIG. 14, a liquid crystal display device 600 of the present invention comprises: a display back frame 610, light-guiding plate 611, optical film 612, light source 613, liquid crystal panel 614 and front frame 615.

In the instant embodiment, display back frame 610 can be any of the display back frames of aforementioned embodiments. Light-guiding plate 611 comprises a light entering surface and a light exiting surface and is disposed inside the display back frame 610. Optical film 612 is disposed on the light-guiding plate 611. Light source 613 is disposed on side wall 619 of the display back frame 610 facing the light entering surface of light-guiding plate 611. Liquid crystal panel 614 is disposed on the top part 620 of display back frame 610. In the instant embodiment, a buffer structure 618 is disposed between liquid crystal panel 614 and top part 620 of display back frame 610 to reduce the friction between display back frame 610 and liquid crystal panel 614 to protect liquid crystal panel 614 more effectively.

In the present embodiment, front frame 615 is assembled with display back frame 610. Specifically, front frame 615 and wide wall 619 of display back frame 610 are fastened through a plurality of buckles 616 so as to sandwich liquid crystal panel 614 firmly between front frame 615 and display back frame 610.

Figure 15:
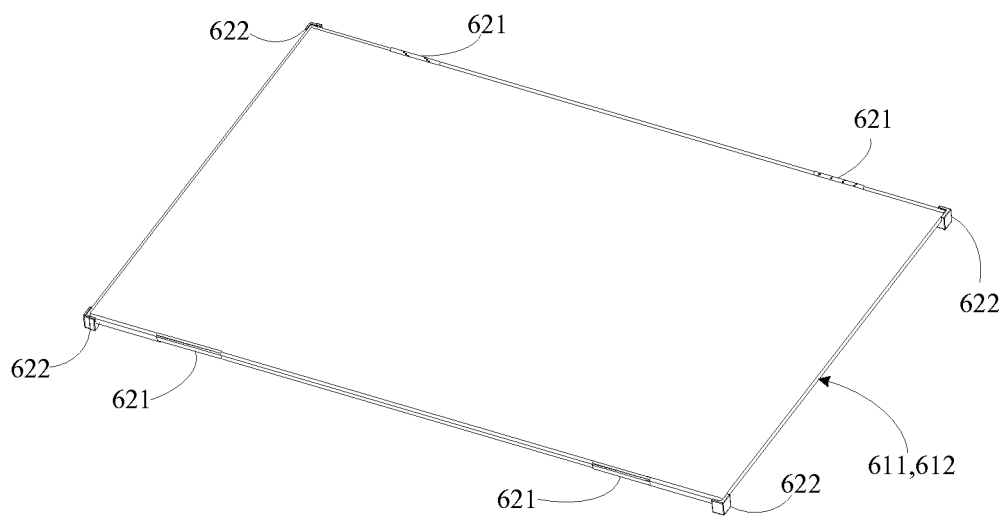
FIG. 15 is a schematic view showing the structure of light-guiding plate and optical film after assembled according to the present invention.

In the present embodiment, light-guiding plate 611 and optical film 612 are further fastened by tape and rubber structure, as specifically shown in FIG. 15.

In FIG. 15, the two side surfaces of light-guiding plate 611 perpendicular to the light-entering surface and light-exiting surface and corresponding sides of optical film 612 are fastened by tape 621 to form optical component. The four corners of the optical components are further fastened by four rubber structures 622 and rubber structures 622 are fastened to first bump 617 (as shown in FIG. 14).

To distinguish from the known liquid crystal display device, the present invention uses stop wall and first bump to fasten and support light-guiding plate, optical film and liquid crystal panel to eliminate the use of mold frame and improves the assembly efficiency and reduce cost. In addition, the display back frame of the present invention can switch between a normal usage state and a folded state with the display back frame in the folded state being smaller in size than in the normal usage state to reduce required space during storage and transport to improve transport and storage efficiency.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A display back frame, which comprises: a plurality of splicing elements spliced together, at least a part of splicing elements being connected through rotation mechanism so that the display back frame able to switch between a normal usage state and a folded state, the display back frame in the folded state being smaller in size than in the normal usage state, wherein the splicing element comprising main part and stop wall, the stop wall comprising bottom part, side wall and top part, the bottom part and outer edge of the main part being connected levelly, the top part disposed in parallel with the bottom part with a spacing gap, the side wall being disposed between the top part and the bottom part, surface of the main part facing the top part being disposed with a first bump and a second bump, wherein height of the first bump being higher than height of the second bump;

wherein, in the normal usage state, the plurality of splicing elements comprise:
a first support frame and a second support frame disposed in parallel;
a third support frame and a fourth support frame disposed in parallel; the third support frame connected perpendicularly respectively to one end of each of the first support frame and the second support frame; and the fourth support frame connected perpendicularly respectively to the other end of each of the first support frame and the second support frame.

2. The display back frame as claimed in claim 1, characterized in that the first support frame comprises a first main part and a first extension part extending from one end of the first main part; the second support frame comprises a second main part and a second extension part extending from one end of the second main part; the first extension part and one end of the third support frame, the other end of the third support frame and one end of the second main part away from the second extension part, the second extension part and one end of the aluminum extrusion, the other end of the aluminum extrusion and one end of the first main part away from the first extension part are all connected respectively through the rotation mechanism.

3. A display back frame, which comprises: a plurality of splicing elements spliced together, at least a part of splicing elements being connected through rotation mechanism so that the display back frame able to switch between a normal usage state and a folded state, the display back frame in the folded state being smaller in size than in the normal usage state, wherein the splicing element comprising main part and stop wall, the stop wall comprising bottom part, side wall and top part, the bottom part and outer edge of the main part being connected levelly, the top part disposed in parallel with the bottom part with a spacing gap, the side wall being disposed between the top part and the bottom part, surface of the main part facing the top part being disposed with a first bump.

4. The display back frame as claimed in claim 3, characterized in that the surface of the main part facing the top part is also disposed with a second bump, wherein height of the first bump is higher than height of the second bump.

5. The display back frame as claimed in claim 3, characterized in that the display back frame comprise two first main splicing elements disposed in parallel and two second main slicing elements disposed in parallel; two ends of each first main splicing element being connected to one end of each second main splicing element through the rotation mechanism, a position-stopping mechanism being disposed at connection point between the first main splicing element and the second main splicing element.

6. The display back frame as claimed in claim 5, characterized in that the display back frame further comprises: two first auxiliary splicing elements and a second auxiliary splicing element; wherein first auxiliary splicing elements are in parallel with second main splicing elements, and second auxiliary splicing element is in parallel with first main splicing elements, two ends of second auxiliary splicing element are respectively connected to two first auxiliary splicing elements through rotation mechanism.

7. The display back frame as claimed in claim 3, characterized in that the display back frame comprises two first main splicing elements disposed in parallel in normal usage state, two second main splicing elements disposed in parallel in normal usage state and at least two auxiliary splicing elements disposed crossly, wherein the at least two auxiliary splicing elements are connected through rotation mechanism, one end of the first main splicing element and one end of the second main splicing element are connected to one end of the corresponding auxiliary splicing element through rotation mechanism.

8. The display back frame as claimed in claim 7, characterized in that the number of auxiliary splicing elements is four, the display back frame further comprises a first auxiliary mechanism, the other end of each of the four auxiliary splicing elements is connected to the first auxiliary mechanism through the rotation mechanism;

the display back frame further comprises four second auxiliary mechanisms, one end of the first main splicing element, one end of the second main splicing element and one end of auxiliary splicing element are connected respectively to corresponding second auxiliary mechanism through rotation mechanism.

9. The display back frame as claimed in claim 3, characterized in that, in the normal usage state, the plurality of splicing elements comprise:
a first support frame and a second support frame disposed in parallel;
a third support frame and a fourth support frame disposed in parallel; the third support frame connected perpendicularly respectively to one end of each of the first support frame and the second support frame; and the fourth support frame connected perpendicularly respectively to the other end of each of the first support frame and the second support frame;
wherein a plurality of auxiliary support frames being disposed the first support frame and the second support frame, two ends of the auxiliary support frames being connected to the first support frame and the second support frame, respectively.

10. The display back frame as claimed in claim 9, characterized in that the first support frame comprises a first main part and a first extension part extending from one end of the first main part the second support frame comprises a second main part and a second extension part extending from one end of the second main part; the first extension part and one end of the third support frame, the other end of the third support frame and one end of the second main part away from the second extension part, the second extension part and one end of the aluminum extrusion, the other end of the aluminum extrusion and one end of the first main part away from the first extension part are all connected respectively through the rotation mechanism.

11. The display back frame as claimed in claim 10, characterized in that, in the folded state, the first main part is connected levelly to the fourth support frame and is located between the first extension part and the second extension part; the second main part is connected levelly to the third support frame and is located between the first extension part and the second extension part; total length of the first main part levelly connected to the fourth support frame is equal to total length of the second main part levelly connected to the third support frame.

12. A liquid crystal display device, which comprises:
a display back frame, formed by splicing a plurality of splicing elements together, at least a part of splicing elements being connected through rotation mechanism so that the display back frame able to switch between a normal usage state and a folded state, the display back frame in the folded state being smaller in size than in the normal usage state, wherein the splicing element comprising main part and stop wall, the stop wall comprising bottom part, side wall and top part, the bottom part and outer edge of the main part being connected levelly, the top part disposed in parallel with the bottom part with a spacing gap, the side wall being disposed between the top part and the bottom part, surface of the main part facing the top part being disposed with a first bump;
light-guiding plate, disposed inside the display back frame, comprising a light entering surface and a light exiting surface;
optical film, disposed on the light-guiding plate;
light source, disposed on side wall of the display back frame facing the light entering surface of light-guiding plate;
liquid crystal panel, disposed on the top part of the back frame of liquid crystal display device; and
front frame, assembled with the display back frame, for sandwiching liquid crystal panel firmly between the front frame and the display back frame.

13. The liquid crystal display device as claimed in claim 12, characterized in that the surface of the main part facing the top part is also disposed with a second bump, wherein height of the first bump is higher than height of the second bump.

14. The liquid crystal display device as claimed in claim 12, characterized in that the display back frame comprise two first main splicing elements disposed in parallel and two second main slicing elements disposed in parallel; two ends of each first main splicing element being connected to one end of each second main splicing element through the rotation mechanism, a position-stopping mechanism being disposed at connection point between the first main splicing element and the second main splicing element.

15. The liquid crystal display device as claimed in claim 14, characterized in that the display back frame further comprises: two first auxiliary splicing elements and a second auxiliary splicing element; wherein first auxiliary splicing elements are in parallel with second main splicing elements, and second auxiliary splicing element is in parallel with first main splicing elements, two ends of second auxiliary splicing element are respectively connected to two first auxiliary splicing elements through rotation mechanism.

16. The liquid crystal display device as claimed in claim 12, characterized in that the display back frame comprises two first main splicing elements disposed in parallel in normal usage state, two second main splicing elements disposed in parallel in normal usage state and at least two auxiliary splicing elements disposed crossly, wherein the at least two auxiliary splicing elements are connected through rotation mechanism, one end of the first main splicing element and one end of the second main splicing element are connected to one end of the corresponding auxiliary splicing element through rotation mechanism.

17. The liquid crystal display device as claimed in claim 16, characterized in that the number of auxiliary splicing elements is four, the display back frame further comprises a first auxiliary mechanism, the other end of each of the four auxiliary splicing elements is connected to the first auxiliary mechanism through the rotation mechanism;
the display back frame further comprises four second auxiliary mechanisms, one end of the first main splicing element, one end of the second main splicing element and one end of auxiliary splicing element are connected respectively to corresponding second auxiliary mechanism through rotation mechanism.

18. The liquid crystal display device as claimed in claim 12, characterized in that, in the normal usage state, the plurality of splicing elements comprise:
a first support frame and a second support frame disposed in parallel;
a third support frame and a fourth support frame disposed in parallel; the third support frame connected perpendicularly respectively to one end of each of the first support frame and the second support frame; and the fourth support frame connected perpendicularly respectively to the other end of each of the first support frame and the second support frame;
wherein a plurality of auxiliary support frames being disposed the first support frame and the second support frame, two ends of the auxiliary support frames being connected to the first support frame and the second support frame, respectively.

19. The liquid crystal display device as claimed in claim 18, characterized in that the first support frame comprises a first main part and a first extension part extending from one end of the first main part; the second support frame comprises a second main part and a second extension part extending from one end of the second main part; the first extension part and one end of the third support frame, the other end of the third support frame and one end of the second main part away from the second extension part, the second extension part and one end of the aluminum extrusion, the other end of the aluminum extrusion and one end of the first main part away from the first extension part are all connected respectively through the rotation mechanism.

20. The liquid crystal display device as claimed in claim 19, characterized in that, in the folded state, the first main part is connected levelly to the fourth support frame and is located between the first extension part and the second extension part; the second main part is connected levelly to the third support frame and is located between the first extension part and the second extension part; total length of the first main part levelly connected to the fourth support frame is equal to total length of the second main part levelly connected to the third support frame.

* * * * *